(12) United States Patent
Murata

(10) Patent No.: US 8,456,219 B2
(45) Date of Patent: Jun. 4, 2013

(54) H BRIDGE DRIVER CIRCUIT

(75) Inventor: Tsutomu Murata, Mizuho (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 13/533,638

(22) Filed: Jun. 26, 2012

(65) Prior Publication Data

US 2013/0009690 A1 Jan. 10, 2013

(30) Foreign Application Priority Data

Jul. 5, 2011 (JP) .................. 2011-149584

(51) Int. Cl.
 *H02M 7/219* (2006.01)
(52) U.S. Cl.
 USPC ........... 327/424; 327/110; 327/112; 327/423; 327/588; 318/400.29; 326/83
(58) Field of Classification Search
 USPC ................. 327/108, 110, 112, 423, 424, 494, 327/587, 588; 318/400.26, 400.29; 326/82, 326/83
 See application file for complete search history.

(56) References Cited

U.S. PATENT DOCUMENTS

| 5,257,175 A * | 10/1993 | Skelton et al. ............. 363/56.02 |
| 6,989,955 B2 * | 1/2006 | Ziemer et al. .................... 360/75 |
| 7,142,436 B1 * | 11/2006 | Chen et al. ............... 318/400.29 |
| 7,477,082 B2 * | 1/2009 | Fukazawa ..................... 327/108 |
| 2010/0219783 A1 | 9/2010 | Noie |

FOREIGN PATENT DOCUMENTS

| JP | 2008-289225 A | 11/2008 |
| JP | 2010-206860 A | 9/2010 |

OTHER PUBLICATIONS

Abstract of JP2008-289225 published Nov. 27, 2008; printed on May 22, 2012 from the Espacenet Worldwide Database, 1 page.
Abstract of JP2010-206860 published Sep. 16, 2010; printed on May 22, 2012 from the Espacenet Worldwide Database, 1 page.

* cited by examiner

*Primary Examiner* — Patrick O'Neill
(74) *Attorney, Agent, or Firm* — Osha Liang LLP

(57) ABSTRACT

A PWM mode for turning on and off two output transistors by an output of a high impedance circuit and a constant voltage mode for controlling voltages at two output terminals by an output of an op amp are provided. Then, the two modes are switched by a switching signal.

3 Claims, 9 Drawing Sheets

H BRIDGE DRIVER CIRCUIT

CROSS-REFERENCE TO RELATED APPLICATION(S)

The entire disclosure of Japanese Patent Application No. 2011-149584 filed on Jul. 5, 2011, including specification, claims, drawings, and abstract, is incorporated herein by reference in its entirety.

BACKGROUND

1. Technical Field

The present invention relates to an H bridge driver circuit including two arms formed from directly connected upper and lower transistors for supplying a current in a forward direction and a reverse direction to a coil connected to a connection point of the upper transistor and the lower transistor of both arms as an output terminal.

2. Background Art

Heretofore, H bridge circuits are used to drive motor coils, such as of voice coil motors. The H bridge circuit has two arms formed from directly connected upper and lower transistors and a connection point of upper and lower transistors of both arms is an output terminal whereto a coil is connected. Accordingly, when the upper transistor of one arm and the lower transistor of the other arm are turned on, a current of one direction is supplied to the coil. Conversely, when the lower transistor of one arm and the upper transistor of the other arm are turned on, a current of opposite direction can be supplied to the coil.

For example, a vibrator in a cellular phone often utilizes a voice coil motor driven using the above-mentioned H bridge circuit.

Here, it is necessary to control an output current of the H bridge circuit in accordance with the strength of the vibrator and pulse width modulation (PWM) is usually used. In PWM control, in a state where the lower transistor of one arm is on, the upper transistor of the other arm is turned on and off to control the output current.

Patent Documents
Japanese Patent Laid-Open Publication No. 2008-289225
Japanese Patent Laid-Open Publication No. 2010-206860

SUMMARY OF THE INVENTION

Here, in PWM control, the upper transistor is turned on and off at a predetermined frequency. This frequency is sufficiently large compared to a switching frequency of output current to the coil. For example, with a switching frequency of the voice coil motor at several 100 Hz, there are many cases where the switching frequency in PWM control is a frequency of several 100 kHz. Then, the upper transistor is turned on and off over a full range. Accordingly, there are cases where high frequency noise is generated, which may become a problem depending on the condition of peripheral circuitry.

The present invention is an H bridge driver circuit comprising two arms formed from directly connected upper transistors and lower transistors, for supplying forward direction and reverse direction currents to a coil connected to connection points of the upper transistors and the lower transistors in both arms as a pair of output terminals, comprising a PWM mode, by supplying a PWM signal having a predetermined duty ratio to control terminals of upper transistors of a first arm and a second arm, for repeating a process turning on and off based on the PWM signal the upper transistor of the second arm in a state where a lower transistor of the first arm is turned on and a process turning on and off based on the PWM signal the upper transistor of the first arm in a state where a lower transistor of the second arm is turned on; and a constant voltage mode, by connecting an output terminal of an op amp inputting a control voltage at one input terminal to control terminals of the upper transistors in both arms and feeding back the pair of output terminals to another input terminal of the op amp, and by controlling voltage of the output terminal to the control voltage, for repeating a process controlling the control terminal voltage of the upper transistor of the second arm to control the voltage of the output terminal to the control voltage in a state where the lower transistor of the first arm is turned on and a process controlling the control terminal voltage of the upper transistor of the first arm to control the voltage of the output terminal to the control voltage in a state where the lower transistor of the second arm is turned on; wherein both modes are switched in accordance with an external switching signal.

Furthermore, in the PWM mode, it is preferable to further perform constant voltage control of voltage at the output terminal.

Furthermore, in the constant voltage mode, it is preferable to further use the control voltage input by the op amp as the PWM signal having a predetermined duty ratio.

According to the present invention, the switching signal enables switching between the PWM mode and the constant voltage mode. Therefore, selecting an appropriate mode in accordance with the installed device makes it possible for a desired motor drive.

DETAILED DESCRIPTION

Embodiments of the present invention will be described hereinafter with reference to the attached drawings.

Figure 1:
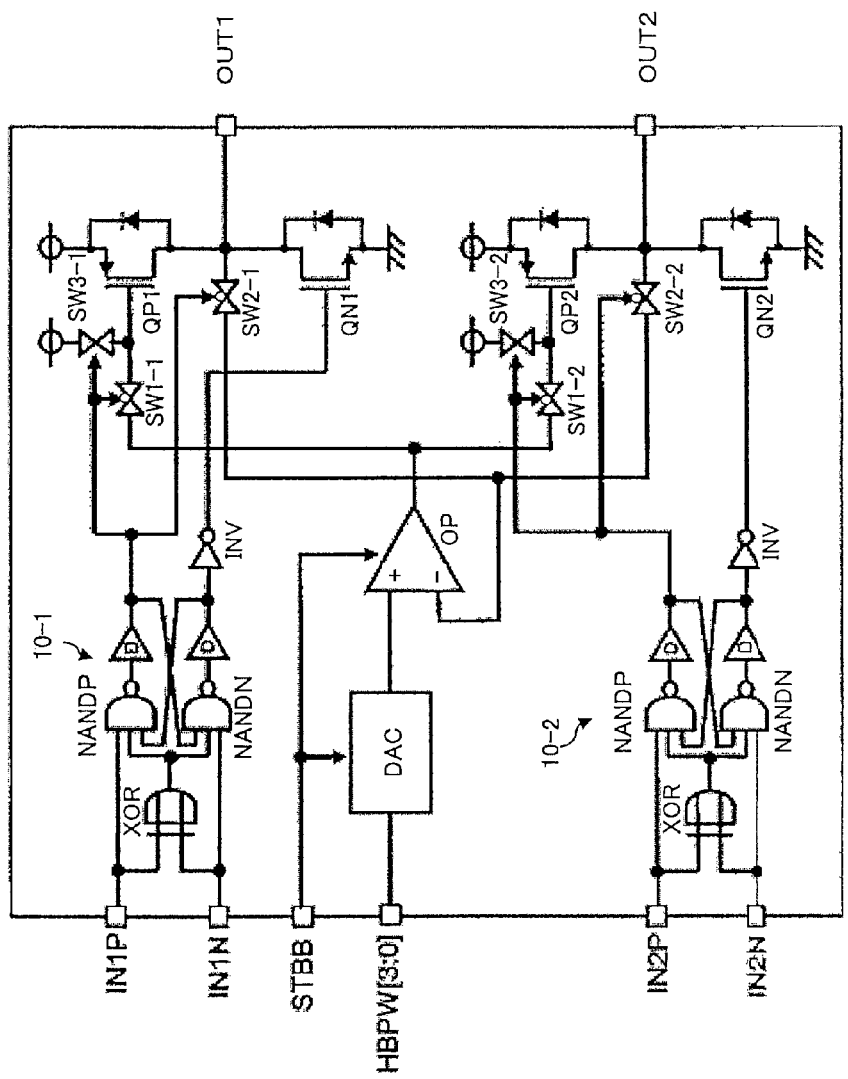
FIG. 1 shows a configuration of an H bridge driver circuit relating to an embodiment.

FIG. 1 shows an example configuration of an H bridge driver circuit configured as one semiconductor integrated circuit relating to an embodiment. A total of 4 signals are input as drive signals for a motor coil: IN1P (P side) and IN1N (N side) to a drive system of side 1 and IN2P (PG side) and IN2N (N side) to a drive system of side 2. Basically, when IN1P and IN2N are on, IN2P and IN1N turn off, and when IN1P and IN2N are off, IN2P and IN1N turn on so that when current is discharged from one drive system (output transistor arm), current is drawn from the other drive system (output transistor arm).

IN1P and IN1N are input by a high-impedance control circuit 10-1. The high-impedance control circuit 10-1 has an exclusive OR circuit XOR for inputting IN1P and IN1N, NAND circuits NANDP and NANDN for respectively inputting IN1P and IN1N, and an inverter INV for inverting an output of the NAND circuit NANDN. Then, an output of the XOR is input by the NANDP and the NANDN. Furthermore, IN1P is input by NANDP and IN1N is input by NANDN, and an output of the NANDP is input by the NANDN and an output of the NANDN is input by the NANDP.

Therefore, when IN1P and IN1N both have the same value, the output of the XOR is fixed at L and the outputs of NANDP and NANDN are both fixed at H. Accordingly, in this case, the P-side output is fixed at H and the N-side output is fixed at L. On the other hand, when IN1P and IN1N are H and L, both outputs become H, and when IN1P and IN1N are L and H, both outputs become L.

The P-side output of the high-impedance control circuit 10-1 becomes a control signal for a switch SW3-1 and when H the switch SW3-1 turns on and when L the switch SW3-1 turns off. The switch SW3-1 is provided in a path linking a gate of an output transistor QP1 and a power supply. When the switch SW3-1 is on, namely, when the P-side output of the high-impedance control circuit 10-1 is H, the transistor QP1 turns off.

Furthermore, the N-side output of the high-impedance control circuit 10-1 is input by a gate of an output transistor QN1. The transistor QP1 is a p-channel transistor, the transistor QN1 is an n-channel transistor, the transistor QP1 has a source connected to the power supply and a drain connected to an output terminal OUT1. The transistor QN1 has a drain connected to the output terminal OUT1 and the drain of the QP1 and a source connected to ground.

Therefore, when H is supplied to the gates of the transistors QP1 and QN1, only the transistor QN1 turns on and a current is drawn from the output terminal OUT1. On the other hand, when L is supplied to the gates of the transistors QP1 and QN1, only the transistor QP1 turns on and a current is discharged from the output terminal OUT1.

Furthermore, for inputs IN2P and IN2N, a high-impedance control circuit 10-2 and output transistors QP2 and QN2 are provided and perform the same operation as the N-side drive system for IN1P and IN1N so that the same output is obtained from an output terminal OUT2.

Furthermore, this circuit inputs a switching signal STBB and a 4-bit control voltage data HBPW. The control voltage data HBPW is supplied to a digital analog converter DAC and converted here to an analog control voltage Vout. An output of the DAC is supplied to a positive input terminal of an op-amp OP and an output of the OP is supplied to the gate of the QP1 via a switch SW1-1 and to the gate of the QP2 via a switch SW1-2. Furthermore, the output terminals OUT1 and OUT2 are respectively connected to a negative input terminal of the OP via switches SW2-1 and SW2-2.

The switches SW1-1 to SW3-1 and SW1-2 to SW3-2 are configured from transistors.

Therefore, when the switches SW1-1, SW1-2, SW2-1, and SW2-2 are on, the OP operates so that the output voltage of the output terminals OUT1 and OUT2 becomes the input control voltage Vout.

Furthermore, as described hereinabove, the P-side outputs of the high-impedance control circuit 10-1 and 10-2 are not supplied directly to the gates of the transistors QP1 and QP2 but are supplied as control signals to the switches SW3-1 and SW3-2 arranged in a path linking the gates of the QP1 and QP2 to the power supply. Furthermore, the P-side outputs of the high-impedance control circuits 10-1 and 10-2 are input as inverted control signals by the switches SW1-1, SW1-2, SW2-1, and SW2-2. The switches SW3-1 and SW3-2 turn on when the supplied control signals are H and turn off when L and the switches SW1-1, SW1-2, SW2-1, and SW2-2 turn on when the supplied control signals are L and turn off when H.

Therefore, when the P-side outputs of the high-impedance control circuits 10-1 and 10-2 are L, the gates of the transistors QP1 and QP2 connect to the output terminal of the OP and the transistors turn on in accordance with the voltage of the OP, and when H, the gates of the transistors QP1 and QP2 connect to the power supply and the transistors turn off. When the gates of the transistors QP1 and QP2 connect to the output terminal of the OP and the OP is operating, the QP1 and QP2 are controlled so that the output terminals OUT1 and OUT2 become Vout, and when the OP is not operating, the gates of the transistors QP1 and QP2 connect to ground and the transistors are fully turned on so that the output terminals OUT1 and OUT2 become H.

Furthermore, the switching signal STBB is supplied to the DAC and the OP and they operate when the switching signal STBB indicates (such as H) a PWM mode and stop operation when L.

Constant Voltage Drive Mode

In this circuit, the switching signal STBB=H. If in the constant voltage drive mode, the DAC and the OP operate. Then, if any of IN1P, IN1N, IN2P, or IN2N is L or H, the outputs of the impedance control circuits 10-1 and 10-2 become P-side H and N-side H. Therefore, either switch SW3-1 or SW3-2 is on and either transistor QP1 or QP2 is off. On the other hand, the gates of the transistors QN1 and QN2 are L and these transistors are also off. Therefore, the outputs of the output terminals OUT1 and OUT2 become a high-impedance state (Hiz).

When IN1P, IN1N, IN2P, and IN2N are L, H, H, and L (reverse current mode), the P-side output of the impedance control circuit 10-1 becomes H so that the switch SW3-1 turns on, the switches SW1-1 and 1-2 turn off, the gate of the transistor QP1 connects to the power supply, and the transistor turns off. On the other hand, since the N-side output of the impedance control circuit 10-1 becomes H, the transistor QN1 turns on and the output terminal OUT1 becomes L.

Furthermore, since the P-side output of the impedance control circuit 10-2 is L, the switch SW3-2 turns off, the switches SW1-2 and SW2-2 turn on, and the gate of the transistor QP2 connects to the output terminal of the OP. On the other hand, since the N-side output of the impedance control circuit 10-2 becomes L, the transistor QN2 turns off. Therefore, the voltage of the output terminal OUT2 is controlled to Vout by the OP.

When IN1P, IN1N, IN2P, and IN2N are H, L, L, and H (forward current mode), the control to the output terminals OUT1 and OUT2 is only reversed and the output terminal OUT2 is controlled to L and OUT1 to Vout.

The state as mentioned above when STBB=H is shown in Table 1.

TABLE 1

| | Signal Name | | | | | |
|---|---|---|---|---|---|---|
| | IN1P | IN1N | IN2P | IN2N | OUT1 | OUT2 |
| Hiz mode | L | L | L | L | Hiz | Hiz |
| Reverse current mode | L | H | H | L | L | Vout |
| Forward current mode | H | L | L | H | Vout | L |
| Hiz mode | H | H | H | H | Hiz | Hiz |

Figure 3A:
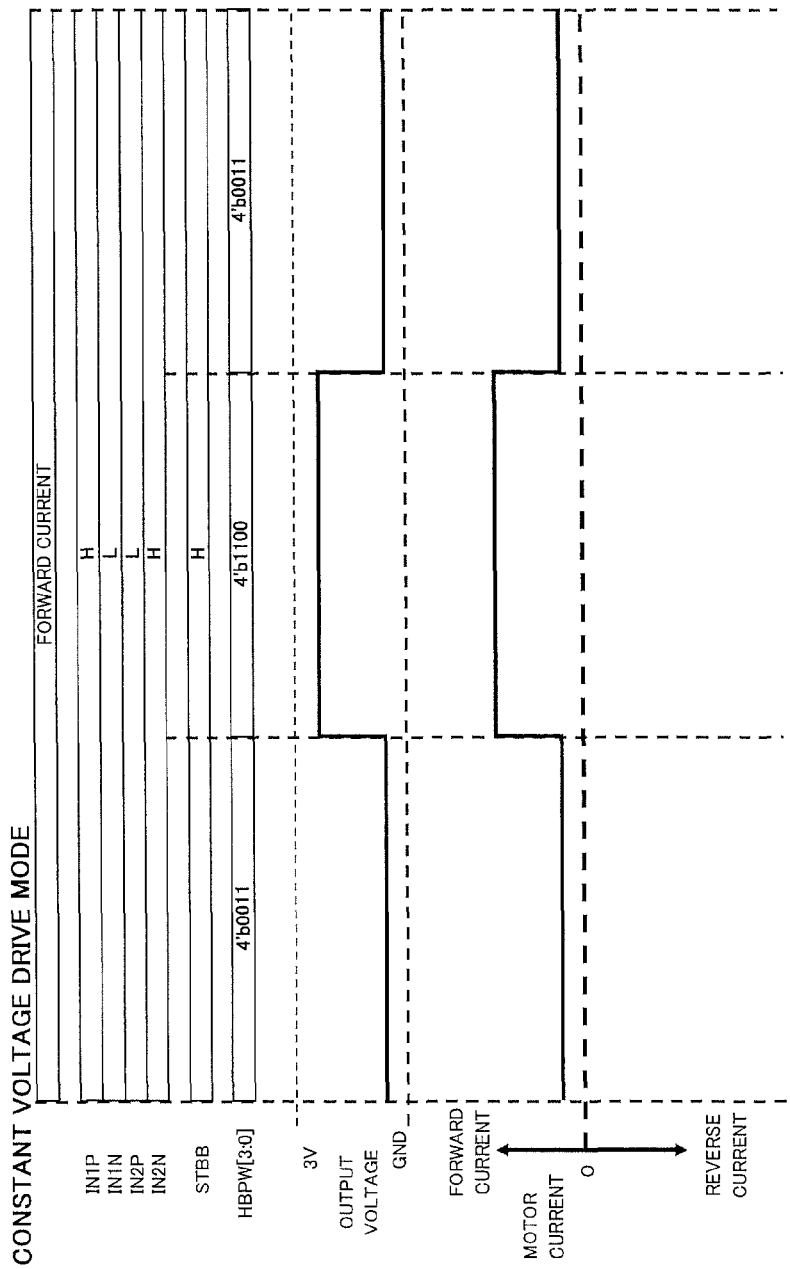
FIG. 3A illustrates constant voltage mode drive.
Figure 3B:
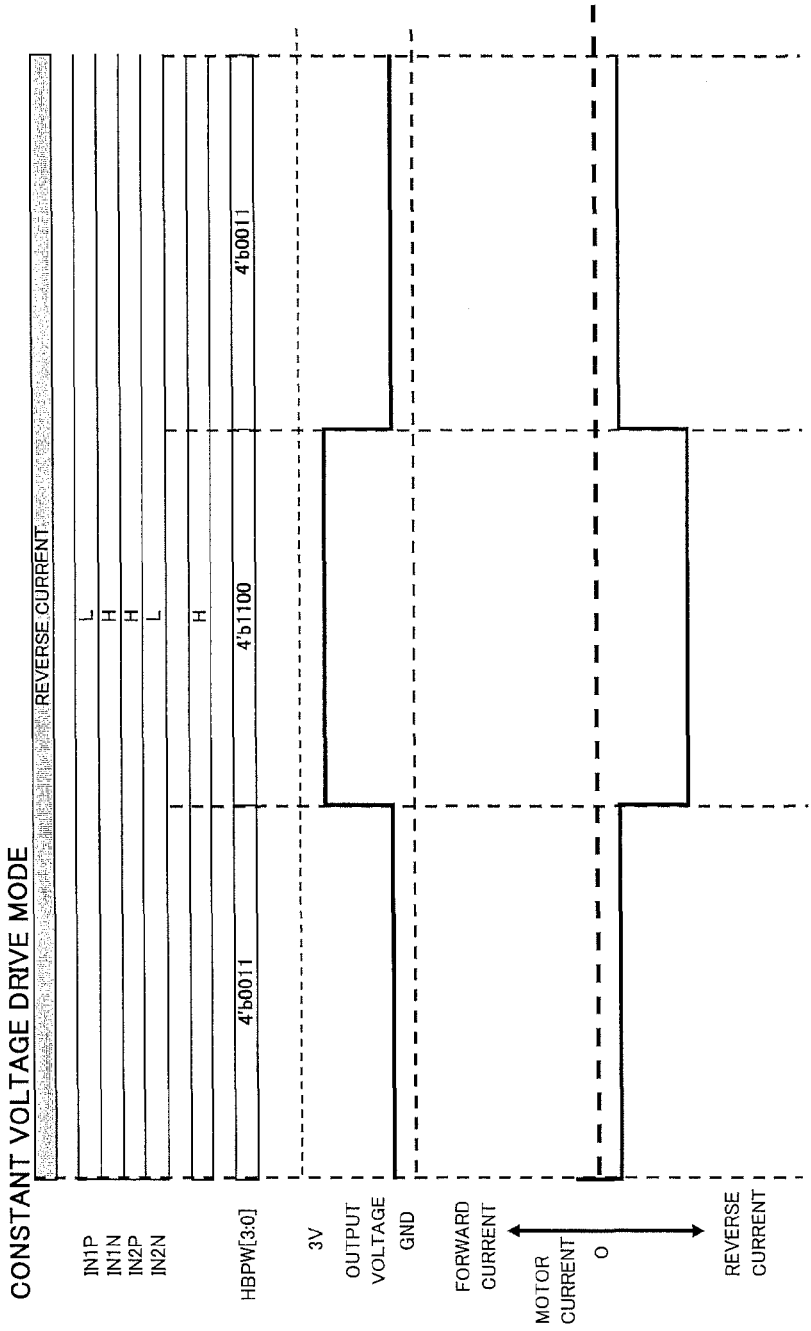
FIG. 3B illustrates constant voltage mode drive.

Here, in FIGS. 3A and 3B, the reverse current mode and the forward current mode in the constant voltage drive mode have a period thereof divided into three periods and by changing the value of the control voltage data HBPW the output voltage Vout changes in three steps.

PWM Drive Mode

On the other hand, in the PWM mode where the switching signal STBB=L, the operations of the DAC and the OP stop so that the output terminal of the OP connects to ground.

When IN1P, IN1N, IN2P, and IN2N are all H or L, the transistors QP1, QN1, QP2, QN2 all turn off and the output terminals OUT1 and OUT2 enter a high-impedance state, which is the same as when STBB=H.

When IN1P, IN1N, IN2P, and IN2N are L, H, H, and L (reverse current mode), the OP is not operating so that the OUT2 becomes an H level and the OUT1 becomes an L level. When IN1P, IN1N, IN2P, and IN2N are H, L, L, and H (forward current mode), the OUT1 becomes an H level and the OUT2 becomes an L level.

The state as mentioned above when STBB=H is shown in Table 2.

TABLE 2

| | Signal Name | | | | | |
|---|---|---|---|---|---|---|
| | IN1P | IN1N | IN2P | IN2N | OUT1 | OUT2 |
| Hiz mode | L | L | L | L | Hiz | Hiz |
| Reverse current mode | L | H | H | L | L | H |
| Forward current mode | H | L | L | H | H | L |
| Hiz mode | H | H | H | H | Hiz | Hiz |

Then, in the case of the PWM mode, in a state where either transistor QN1 or QN2 is on, the transistors QP2 and QP1 of the other arm are turned on and off at a predetermined duty ratio. As a result, the period of H of the output voltage from the output terminals OUT1 and OUT2 is controlled so that the output voltage is controlled.

Figure 2A:
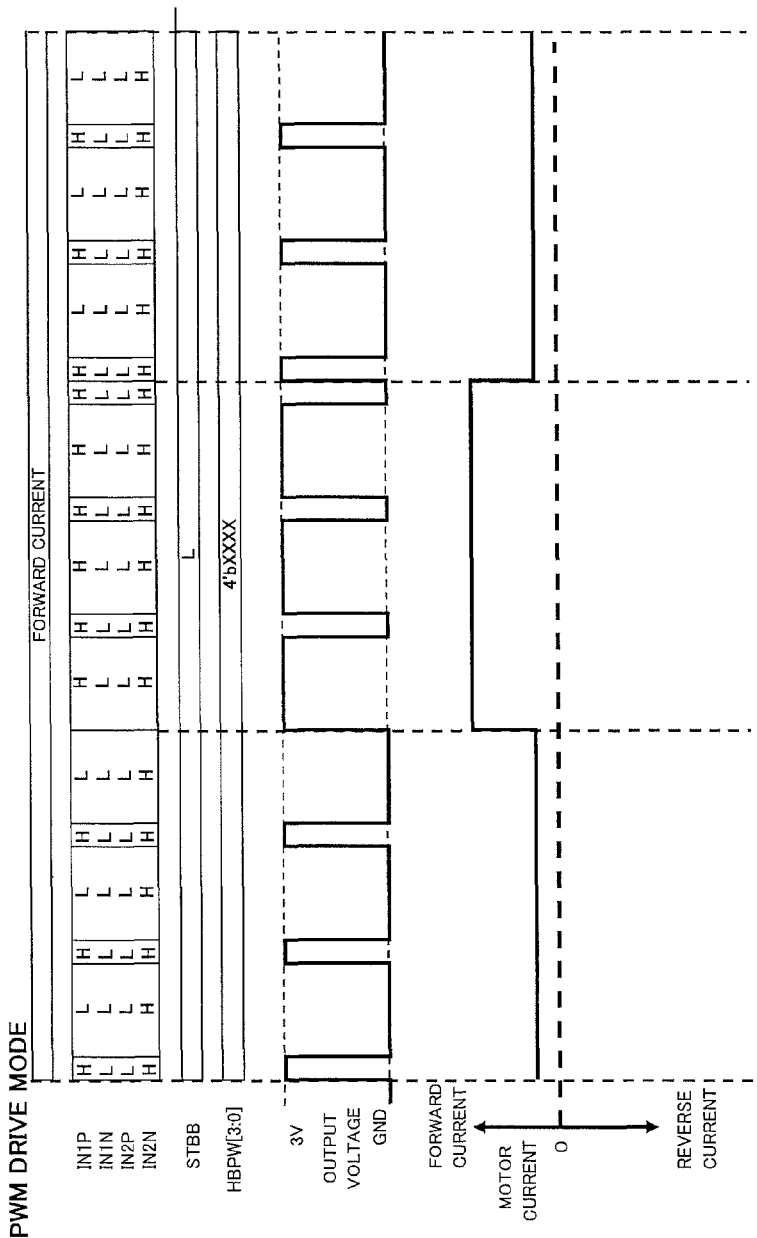
FIG. 2A illustrates PWM mode drive.
Figure 2B:
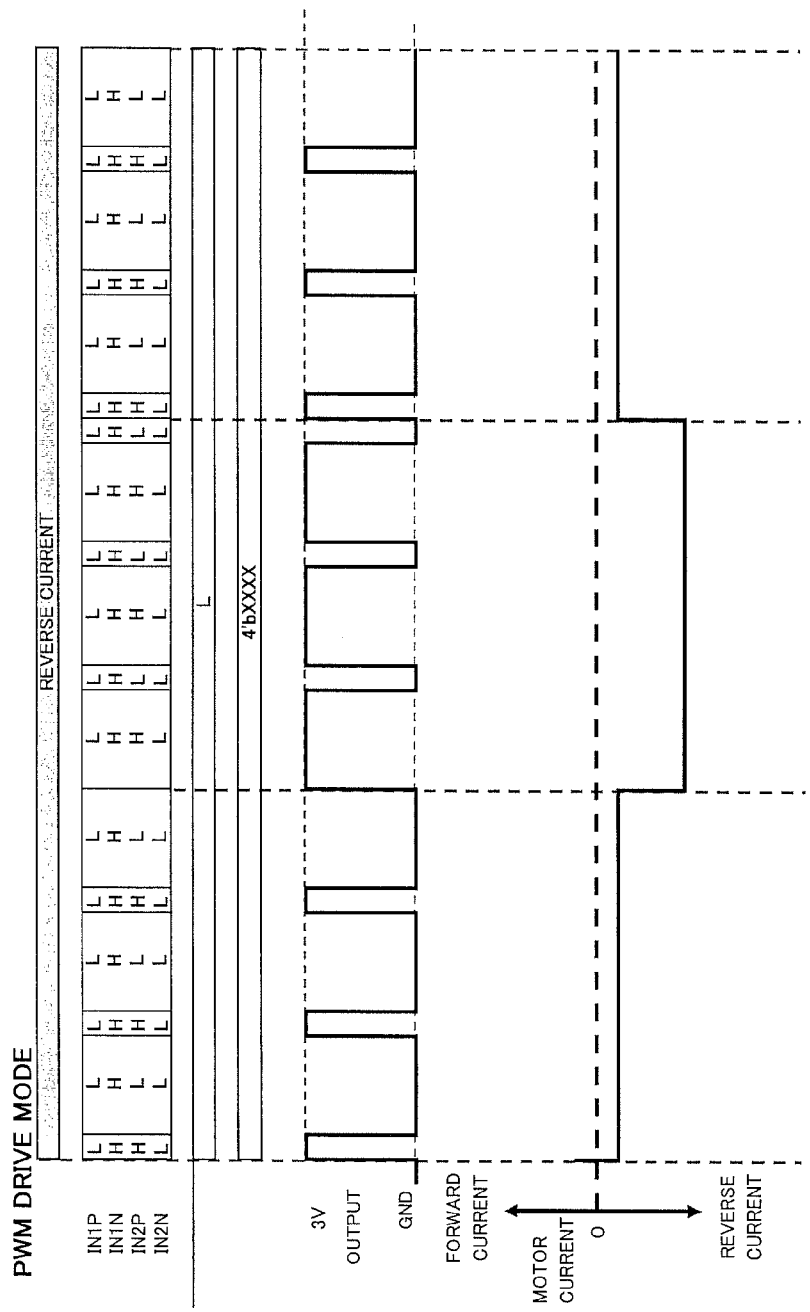
FIG. 2B illustrates PWM mode drive.

For example, as shown in FIGS. 2A and 2B, at a ratio of the periods when IN1P, IN1N, IN2P, and IN2N are HLLH and LLLH, the motor current is controlled in the reverse current mode and at a ratio of the periods when IN1P, IN1N, IN2P, and IN2N are LHHL and LHLL, the motor current is controlled in the forward current mode. In this example, in both the reverse current mode and the forward current mode, the motor current is controlled by switching the duty ratio to 15%, 85%, and 15%.

In this manner, according to the embodiment, the constant voltage mode and the PWM mode can be switched by the switching signal STBB and the drive in either mode becomes possible in accordance with a set-side request.

Here, in the above-mentioned example, control is performed so that the voltages of the output terminals OUT1 and OUT2, which output currents, are increased and decreased between the power supply voltage and ground in the PWM mode and set constant at Vout in the constant voltage mode. However, these modes can also be combined.

Constant Voltage+PWM (1)

Figure 4A:
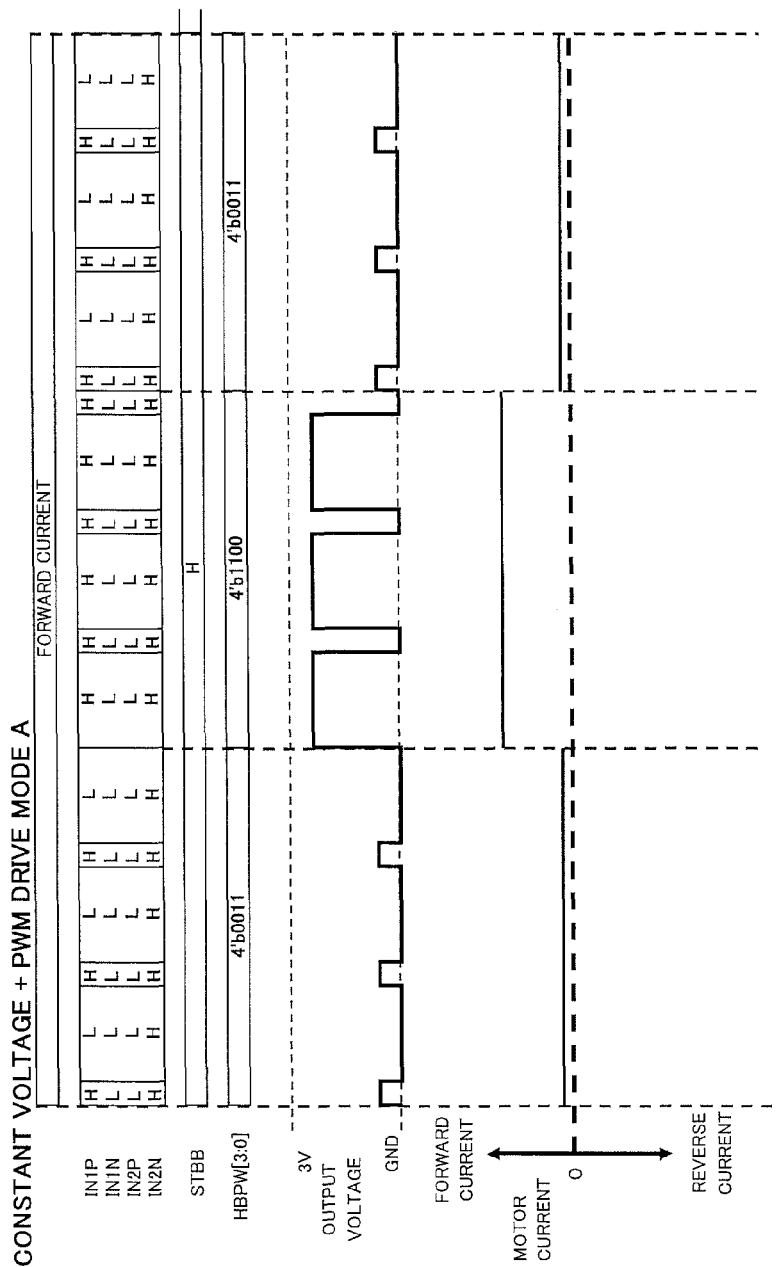
FIG. 4A illustrates constant voltage+PWM mode (1) drive.
Figure 4B:
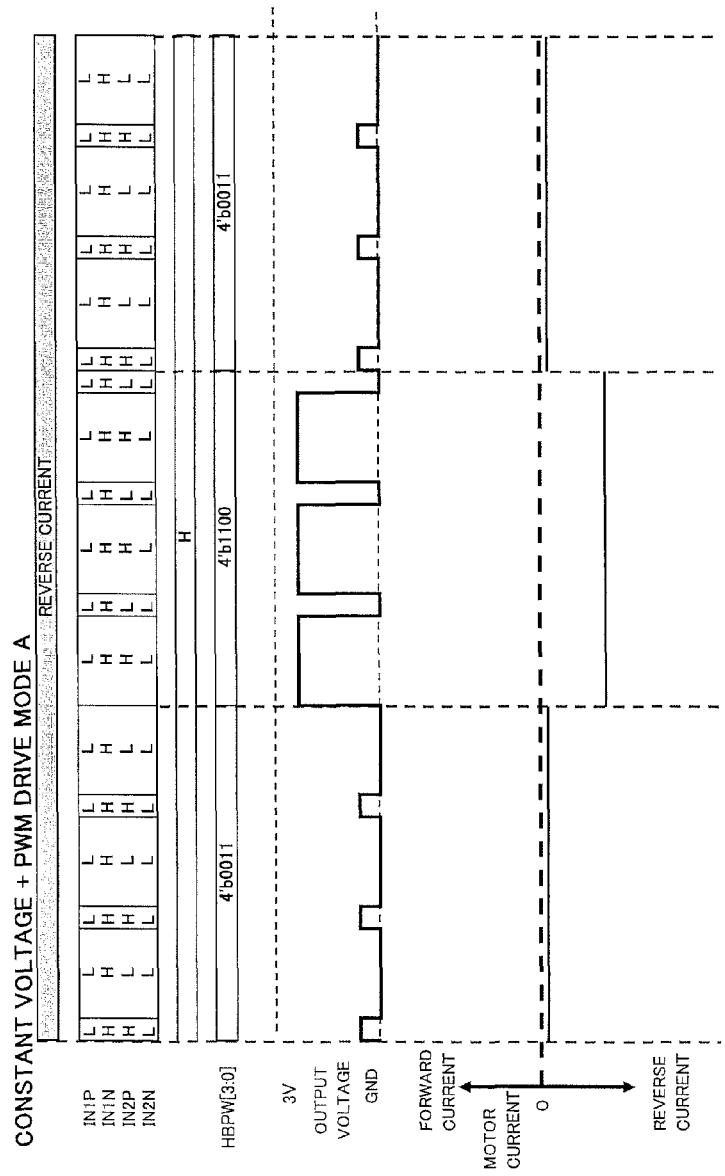
FIG. 4B illustrates constant voltage+PWM mode (1) drive.

FIGS. 4A and 4B show an example of constant voltage control when the transistors QP1 and QP2 are on in the case of the PWM mode. Namely, also in the state of the switching signal STBB=L, the DAC and the OP are operated and constant voltage control is performed so that the upper voltage of the output terminals OUT1 and OUT2 is Vout. Namely, when the P-side output from the impedance control circuits 10-1 and 10-2 is L, the switches SW1-1 and SW1-2 are turned on, the output of the OP is supplied to the gates of the transistors QP1 and QP2, and the voltage of output terminals OUT1 and OUT2 is controlled to Vout by the OP.

Constant Voltage+PWM (2)

Figure 5A:
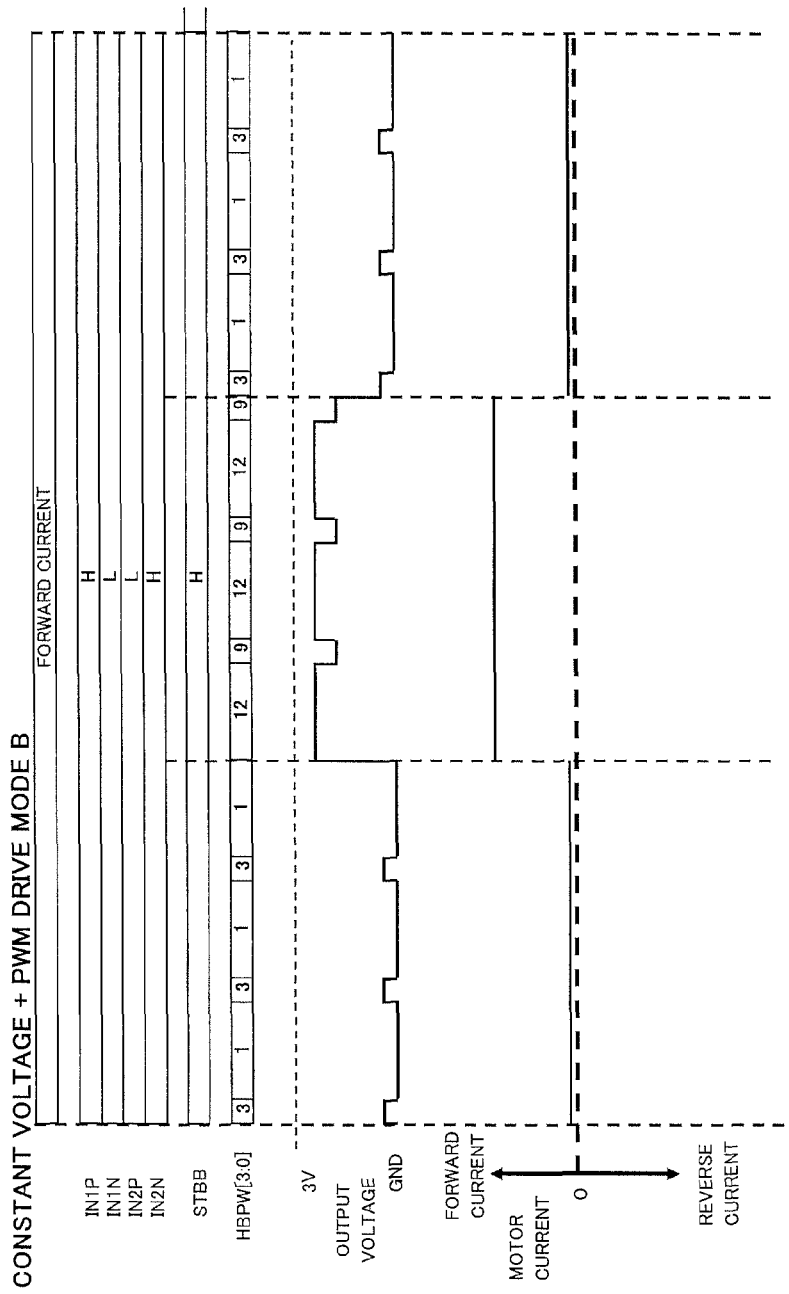
FIG. 5A illustrates constant voltage+PWM mode (2) drive.
Figure 5B:
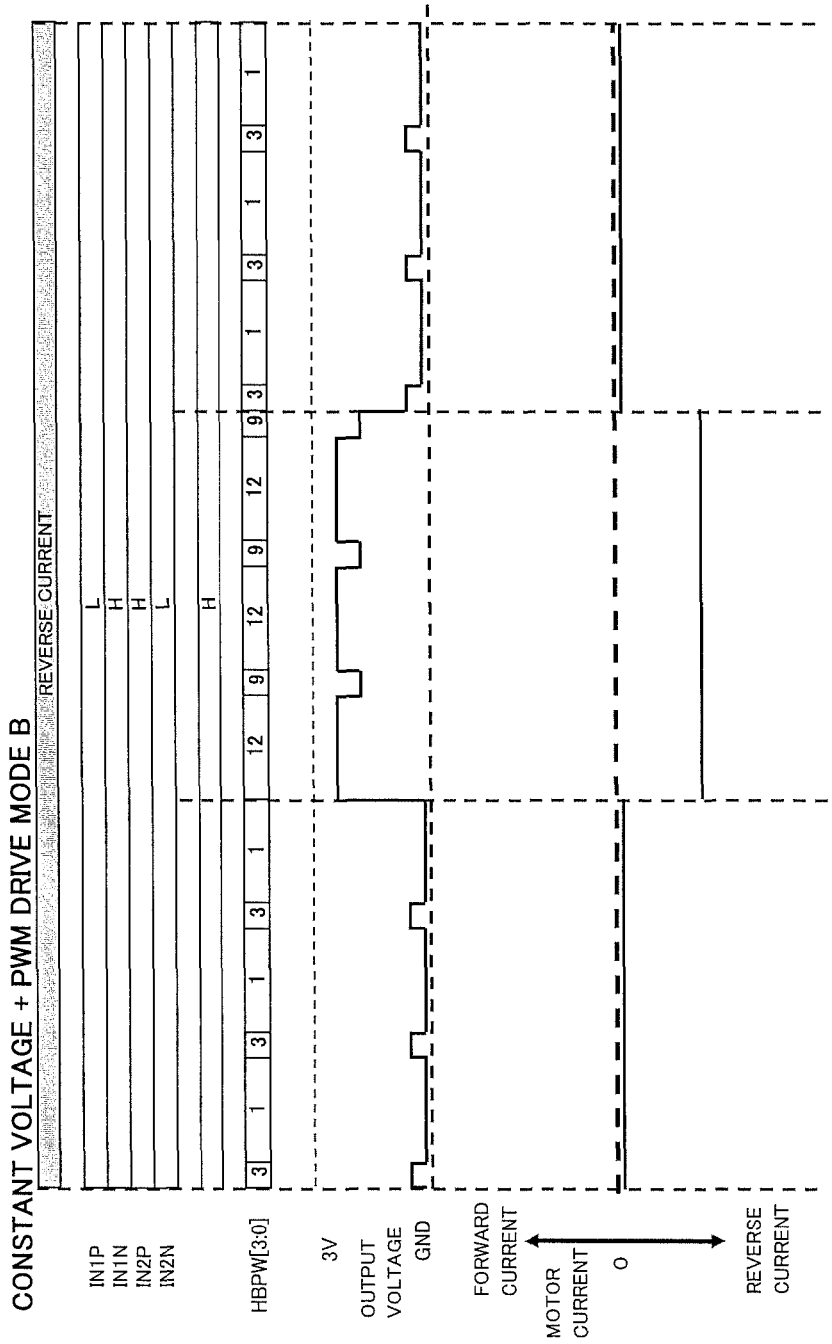
FIG. 5B illustrates constant voltage+PWM mode (2) drive.

FIGS. 5A and 5B show the case where PWM drive is further utilized in the constant voltage mode. Namely, in the constant voltage mode, the control voltage HBPW, which is input, is changed by PWM control. As a result, more detailed output voltage control can be performed without increasing the number of bits in the control voltage data.

By inputting from four inputs the 150 to 200 Hz signals for switching the output transistors, the current direction for the motor coil can be switched. Then, in a state where the 2-side (or 1-side) transistor QN2 (QN1) is turned on, the 1-side (or 2-side) transistor QP1 (QP2) is turned on and off by PWM control so that the amount of current to the coil can be controlled, and in a state where the 2-side (or 1-side) transistor QN2 (QN1) is turned on, the 1-side (or 2-side) transistor QP1 (QP2) is controlled by the OP so that the output terminals OUT1 and OUT2 can be controlled at a constant voltage. Therefore, these can be used properly depending on set-side request.

Furthermore, combining PWM control and constant voltage control enables more advanced output control to be performed.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An H bridge driver circuit comprising two arms formed from directly connected upper transistors and lower transistors, for supplying forward direction and reverse direction currents to a coil connected to connection points of the upper transistors and the lower transistors in both arms as a pair of output terminals, comprising:

a PWM mode, by supplying a PWM signal having a predetermined duty ratio to control terminals of upper transistors of a first arm and a second arm, for repeating a process turning on and off based on the PWM signal the upper transistor of the second arm in a state where a lower transistor of the first arm is turned on and a process turning on and off based on the PWM signal the upper transistor of the first arm in a state where a lower transistor of the second arm is turned on; and a constant voltage mode, by connecting an output terminal of an op amp inputting a control voltage at one input terminal to control terminals of the upper transistors in both arms and feeding back said pair of output terminals to another input terminal of the op amp, and by controlling voltage of one of the pair of output terminals to the control voltage, for repeating a process controlling the control terminal voltage of the upper transistor of the second arm to control the voltage of the one output terminal to the control voltage in a state where the lower transistor of the first arm is turned on and a process controlling the control terminal voltage of the upper transistor of the first arm to control the voltage of the other output terminal of the pair of output terminals to the control voltage in a state where the lower transistor of the second arm is turned on;

wherein both said modes are switched in accordance with an external switching signal.

2. An H bridge driver circuit according to claim 1, wherein in said PWM mode further performs constant voltage control of voltage at the pair of output terminals.

3. An H bridge driver circuit according to claim 1, wherein in said constant voltage mode further uses the control voltage input by said op amp as the PWM signal having a predetermined duty ratio.

* * * * *